United States Patent [19]
Hansen et al.

[11] Patent Number: 5,635,094
[45] Date of Patent: Jun. 3, 1997

[54] CONFORMAL SKATE FOR INDUCTION WELDING

[75] Inventors: Karl A. Hansen, deceased, late of Seattle; John J. Dejong, executor, Bellevue, both of Wash.

[73] Assignee: The Boeing Company, Seattle, Wash.

[21] Appl. No.: 367,545

[22] Filed: Jan. 3, 1995

[51] Int. Cl.$^6$ .................................................. H05B 6/10
[52] U.S. Cl. ........................... 219/633; 219/619; 219/632; 219/644
[58] Field of Search .................................. 219/630, 618, 219/619, 622, 623, 624, 628, 629, 631, 632, 633, 634, 635, 644, 645, 659

[56] References Cited

U.S. PATENT DOCUMENTS

| | | |
|---|---|---|
| 3,061,503 | 10/1962 | Gould et al. . |
| 3,427,421 | 2/1969 | Matheson et al. . |
| 4,288,673 | 9/1981 | Ishibashi . |
| 4,489,123 | 12/1984 | Schijve et al. . |
| 4,671,470 | 6/1987 | Jonas . |
| 4,791,260 | 12/1988 | Waldman . |
| 5,001,319 | 3/1991 | Holmstrom . |
| 5,240,542 | 8/1993 | Miller et al. . |
| 5,248,864 | 9/1993 | Kodokian . |

FOREIGN PATENT DOCUMENTS

| | | |
|---|---|---|
| 0228719 | 7/1987 | European Pat. Off. . |
| 58059039 | 4/1983 | Japan . |

Primary Examiner—Tu B. Hoang
Attorney, Agent, or Firm—John C. Hammar

[57] ABSTRACT

A conformal skate for use in an inductive welding system for creating a fusion bond along a bond line between two thermoplastic parts includes a wheel having a circumferential casing made of fluid impervious flexible material. The wheel is rotatably mounted on a fixed axle by fluid tight bearings. The axle has an axial passage for admission of pressurizing and cooling fluid, and for power leads for the coil and for leads for sensors inside the wheel. A vertical mount on the axle supports the coil for vertical motion and biases the coil downwardly so that it remains in contact with the inside surface of the casing despite unevenness or contour changes in the upper surface of the top part or changes in the wheel shape when the fluid pressure in the wheel or downward force on the axel is changed. A supporting member such as a strut or frame supports the axle and applies the downward force which the wheel distributes over the footprint in contact with the top part, in line with the magnetic field generated by the coil. The size of the wheel footprint is a function of the amount to liquid in the wheel and the force exerted by the supporting member, which pressurizes the fluid sealed in the vessel and distributes pressure uniformly over the footprint of the wheel to press the top part against the bottom part and facilitate fusion bonding of the thermoplastic in the melt pool created by the inductively heated susceptor.

20 Claims, 4 Drawing Sheets

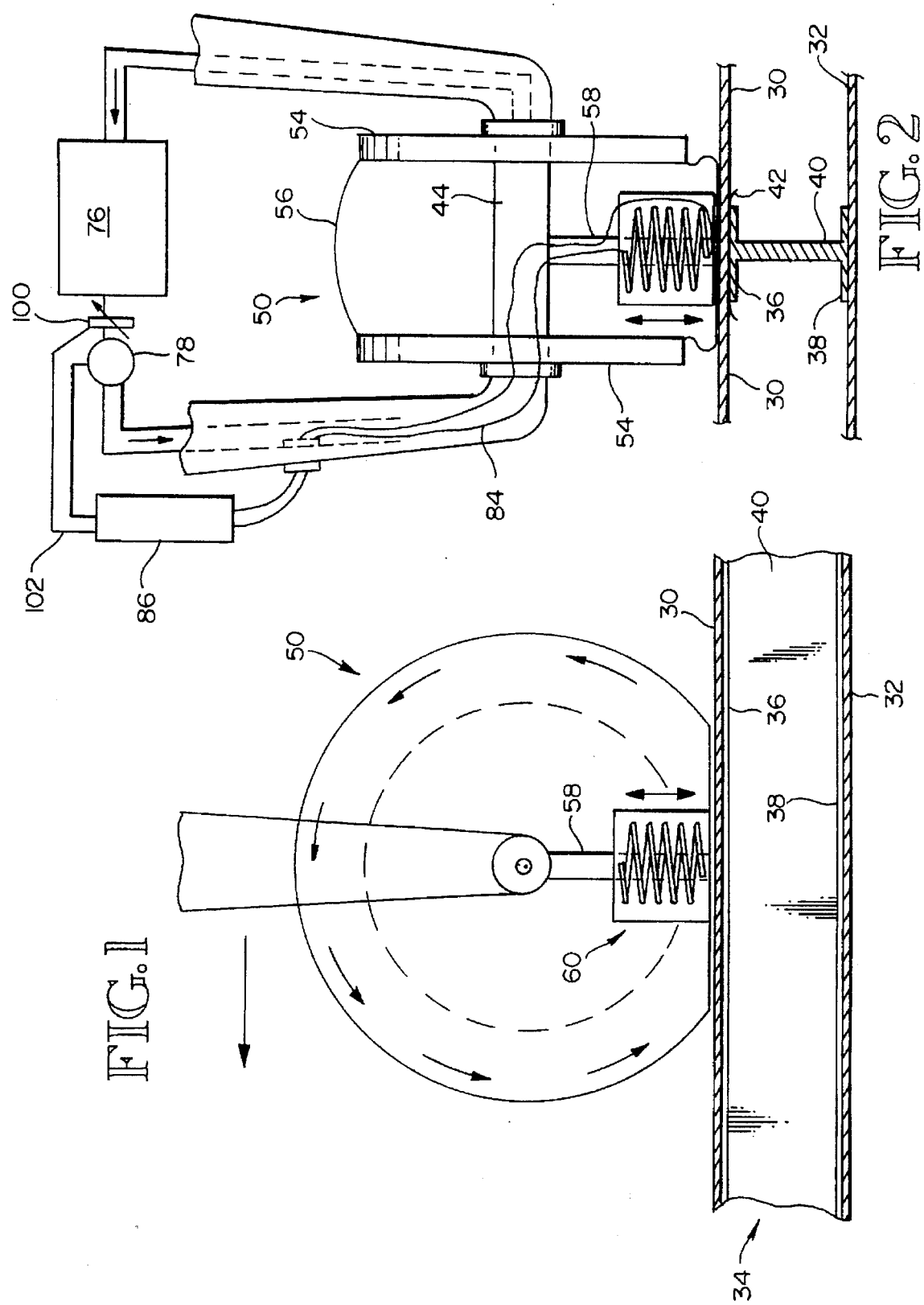

CONFORMAL SKATE FOR INDUCTION WELDING

This invention relates to induction welding of thermoplastic materials, and more particularly to a conformal skate for exerting pressure on the parts to press them together while simultaneously generating heat inductively in the bond line between the parts with an induction coil exactly in line with the pressure exerted by the skate to create a fusion bond.

BACKGROUND OF THE INVENTION

The conventional technique of attaching parts together to form large assemblies in the aerospace industry is with the use of fasteners, such as rivets, bolts, lockbolts, etc. Installation of fasteners is a laborious process, requiring the drilling holes, installing fasteners and securing the fastener, usually one at a time. The holes sometimes must be reamed or cold worked, and the interface between the parts often must be sealed as a guard against corrosion and air or fluid leaks from interior regions under pressure. A significant percentage of the cost of a final assembly, such as a wing box, that is fastened together using conventional fasteners, is in the costs of sealant application and fastener installation and the inevitable rework and scrap that results for the use of fasteners. Enormous resources have been devoted to improving the quality and reliability of fastener installation and to reducing the associated costs, but it remains a troublesome technology, long overdue for radical improvement.

Fusion bonding, or "welding" of thermoplastic composite material, such as polyimide impregnated graphite, is an emerging technology of great promise in the aerospace field for reducing the cost of fastening parts, such as wing spars, ribs and wing skins, together to make large assemblies, such as a wing box. As the use of plastic parts increases in the aerospace field and as their long-term performance becomes better understood, plastic parts will gradually replace aluminum parts and the assembly technologies will assume great economic significance in the aerospace industry. Even today, where plastic parts are widely used of fighter aircraft, fastener technologies have a substantial influence on the cost of the final product.

An apparatus and method for performing welding of thermoplastic composite material is described in U.S. patent application Ser. No. 08/352,991 filed on Dec. 9, 1994, by John Mittleider and entitled "Thermoplastic Welding", the disclosure of which is incorporated herein by reference. The method described in the Mittleider application uses a conductive foraminous susceptor at the interface between two parts to be welded together. Eddy currents in the susceptor, induced by an alternating magnetic field generated by an induction coil, heat the susceptor by resistive heating and raise the temperature of the thermoplastic in the faying surfaces of the two parts in contact with the susceptor to the thermoplastic melt point. Pressure is applied to squeeze the two parts together, pressing the melted thermoplastic through and around the interstices of the susceptor and promoting molecular diffusion of the faying surfaces to form a bond region that is continuous and uniform from one part to the other with no discernible junction between the two parts, other than the embedded susceptor.

In the Mittleider system, pressure is applied with the use of a "skate" that supports the coil and applies pressure on the parts with the use of a pressure part on each side of the coil. The skate is pulled over the parts along the band to be welded and the two pressure parts on either side of the coil press against the top part while the coil in the center heats the interface between the parts, creating a melt pool in which the thermoplastic from the faying surfaces of the two parts commingle under the pressure exerted by the pressure parts to form a bond region with no discernible junction line between the two parts. The reaction force exerted by the skate in the direction opposite to the force exerted by the pressure parts is borne by a pair of headers which guide and support the skate as it is pulled along over the parts.

Although the skate in the Mittleider system works well in the wing box assembly jig described in the aforesaid application, there may be some applications in which a simpler system would be preferable. Where the contour of the top part is more complex or the surface is textured or uneven, a tooling system that is capable of applying uniform pressure on the parts in line with the melt pool at the bond line, without sliding contact between the skate and the top part, could be advantageous.

Thus, the art of thermoplastic welding would be advanced by a tooling system for applying uniform pressure to the top part in line with the melt pool at the interface between the two parts to be fusion bonded by inductive welding using a moving coil.

SUMMARY OF THE INVENTION

Accordingly, it is an object of this invention to provide an improved conformal skate for applying uniform pressure to press the top part of two parts to be inductively welded, in line with a coil that moves over the surface of the parts to produce a magnetic field that generates eddy currents in a susceptor in the interface between the parts, resistively heating the susceptor and melting the faying surfaces of the parts which intermingle in and around the susceptor to form a diffused bond region without a discernible junction line between the parts. Another object of this invention is to provide an improved fluid pressurized conformal skate for applying uniform pressure to press the top part of two parts to be inductively welded in line with a coil while it moves over the parts and is cooled by the fluid that pressurizes the skate.

These and other objects are attained in a conformal skate for use in an inductive welding system for creating a fusion bond along a bond line between two thermoplastic parts. The conformal skate includes a wheel having a circumferential casing made of fluid impervious flexible material. The wheel is mounted for rotation on a fixed axle by fluid tight bearings. The axle has an axial passage for admission of pressurizing fluid and for power leads for the coil and for sensors inside the wheel. A spring loaded vertical mount on the axle supports the coil for vertical motion so that it remains in contact with the inside surface of the casing despite unevenness or contour changes in the upper surface of the top part or changes in the wheel shape when the pressure exerted by the wheel is to be changed. A strut supports the axle and applies the downward force which the wheel distributes over the footprint in contact with the top part in line with the magnetic field generated by the coil. The strut can be moved by a conventional gantry or can be mounted on the frame of a skate such as shown in the Mittleider application. The size of the wheel footprint is a function of the amount to liquid in the wheel and the force exerted by the strut which pressurizes the fluid sealed in the vessel and distributes pressure uniformly over the footprint of the wheel to press the top part against the bottom part and facilitate fusion bonding of the thermoplastic in the melt pool created by the inductively heated susceptor.

DESCRIPTION OF THE DRAWINGS

FIG. 1 is a side elevation of a conformal skate for welding two thermoplastic parts together in accordance with this invention;

FIG. 2 is an end elevation of the conformal skate shown in FIG. 1;

DESCRIPTION OF THE PREFERRED EMBODIMENTS

Figure 3:
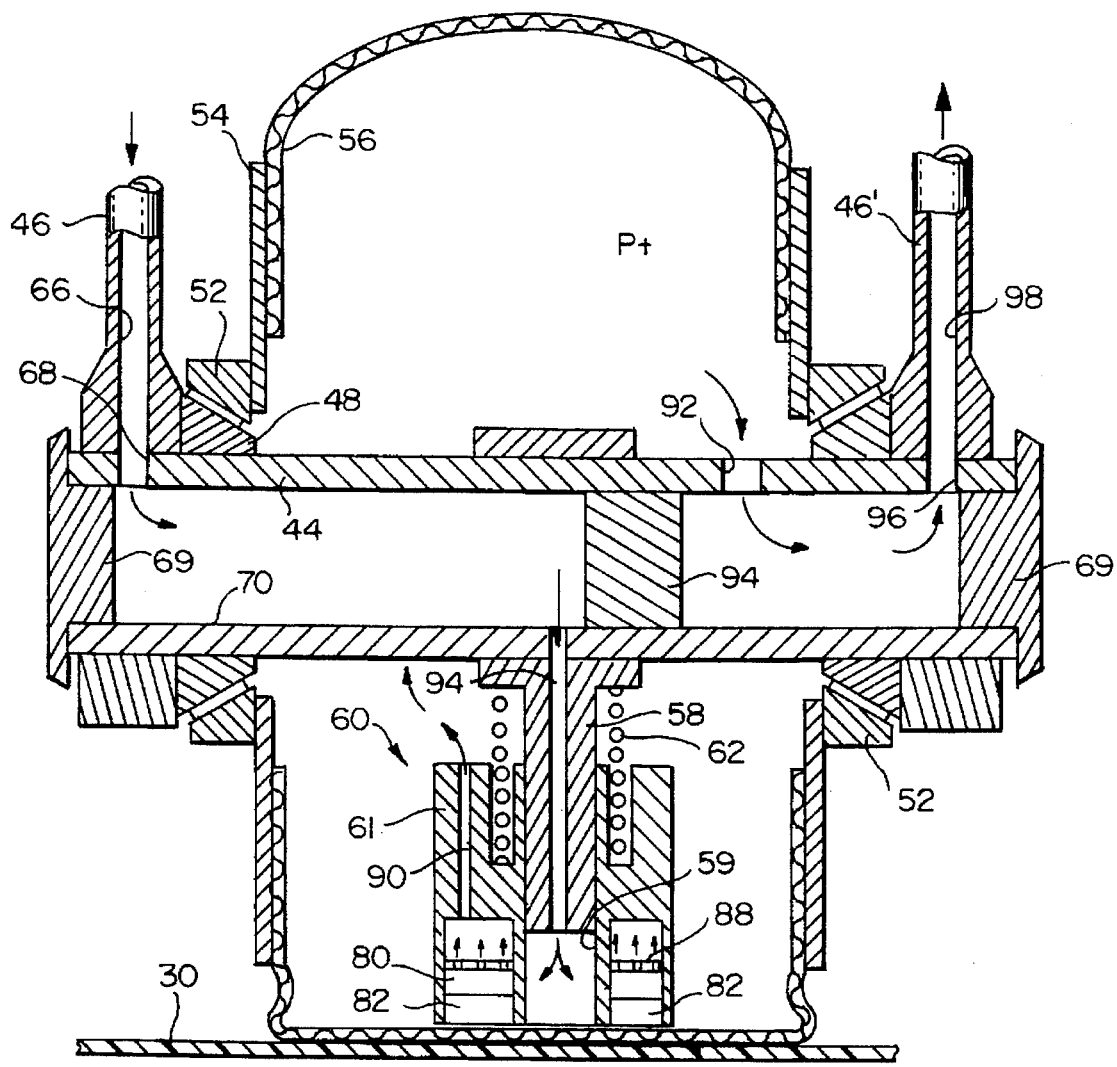
FIG. 3 is a sectional end elevation of one end of the conformal skate shown in FIG. 1, showing details of the wheel bearing and internal routing of cooling and pressurizing fluid.

Turning now to the drawings wherein like reference characters designate identical or corresponding parts, and more particularly to FIG. 1 thereof, a conformal skate is shown for welding by fusion bonding two composite parts, having faying surfaces of thermoplastic or other heat activated material, into an integral assembly.

The conformal skate is illustrated and described herein in an upright position with the skate vertically over the parts being welded. The description of its structure and orientation uses terms referenced to this upright position. However, the skate may be operated in an "upside down" position or in a sideways position, with the axle oriented vertically. Therefore, the upright frame of reference used to describe the relative orientation and position of the parts should be understood as provided merely for clarity of description rather than in any limiting sense.

The preferred embodiment of the apparatus and the process of fusion bonding parts will be described for manufacturing an airplane wing box. The wing box has an upper skin 30, a lower skin 32, and a plurality of spars 34. The spars 34 are made of a thermoplastic composite material such as graphite fiber fabric in a matrix of KIII-B polyimide available from DuPont. Each spar includes an upper spar cap 36 and a lower spar cap 38 connected by a vertical web 40 formed in a generally sinewave planform. The spars 34 are formed using a process disclosed in U.S. patent application Ser. No. 08/590,606 entitled "Thermoplastic Composite Sine Wave Spar Structure" filed by Douglas McCarville and Rodney Bahr. The wing box 28 formed by the upper and lower skins 30 and 32, the spars 34 forms the structural core of an aircraft wing, and also doubles as a fuel tank for the aircraft. This preferred embodiment is merely an example of a type of structure which the apparatus and method of this invention are capable producing; thus it should be understood that the invention is intended to be suitable for manufacturing a wide variety of other integral assemblies by fusion bonding.

The process of welding the upper and lower skins 30 and 32 to the spars 34 and the ribs 36 will be described in detail below, but a summary of the process is as follows: the parts to be welded together are assembled with a resin-encapsulated foraminous conductive susceptor 42 between the faying surfaces. In the case of the wing box, this involves attaching the susceptor 42 to the outer surfaces of the spar caps and then sandwiching the spars between the wing skins 30 and 32. The parts are held in position and squeezed together while an induction work coil is moved along the intended bond line over the outer surface of the wing skin in alignment with the susceptor 42. The coil produces an alternating magnetic field which projects through the wing skin and around the susceptor, generating eddy currents in the susceptor. The magnetic field is strong enough to produce eddy currents of sufficient amperage to heat the susceptor by dielectric heating, raising the temperature of the thermoplastic material in the faying surfaces to its melting temperature. The pressure exerted on the top of the wing skin 30 causes the molten thermoplastic material from the faying surfaces of the two facing parts to flow in and around the interstices of the foraminous susceptor and interdiffuse together. The parts are held in contact while the thermoplastic solidifies, thereby creating a fusion bond.

The conformal skate shown in FIGS. 1 and 2 includes an axle 44 supported on each axial end by a mounting member such as struts 46 and 46'. The struts can be connected together at the top to form a yoke or they can be separately mounted. The struts or yoke typically would be manipulated by a gantry robot, although other mechanisms are available, as will be well understood by those skilled in the art. Alternatively, the axle 44 can be supported in cantilever fashion from one end only with a single strut 46. Two inwardly tapering bearing bushings 48 are attached to the axle as by pinning and sealing to the axel so they are fixed and sealed to the axel 44.

As shown in FIG. 3, a wheel 50 is rotatably mounted on the tapered bearing bushings 48 by way of a pair of outwardly flaring receptacles or sleeve bearings 52. The wheel 50 includes two aluminum plate side walls 54 fastened and sealed to the inner sides of the sleeve bearings 52, and a circumferential casing 56 made of fluid impervious, flexible, inelastic material, such as fiber-reinforced neoprene or polyurethane impregnated Kevlar or the like. The casing material should be transparent to magnetic flux since it will be in the path of a strong magnetic field. The circumferential casing is bonded to the inner sides of the aluminum side walls and bulges radially outward therebeyond to provide a conformal surface that can distribute fluid pressure within the wheel uniformly over the surface of the top part 30 when brought into contact therewith. The surface of at least one of the bearings 48 or 52 is coated with a soft, low friction material that facilitates sealing and low friction sliding of the sleeve bearings 52 on the tapered bearing bushings 48. The pressure within the wheel 50 tends to push the two aluminum plate side walls 54 outward away from each other, pressing the sleeve bearings 52 on the tapered bearing bushings 48. As the pressure increases, the the interface pressure between the two bearing surfaces increases, so the sealing function increases proportionately with the pressure of the fluid in the wheel 50 that is to be confined by the seal.

A vertical mount 58 is fixed to the axle 44 for supporting an induction coil assembly 60. The coil assembly 60 may be the same as that shown in U.S. Pat. No. 5,313,037 entitled "High Power Induction Work Coil for Small Strip Susceptors" issued to Karl Hansen and C. David Lunden on May 17, 1994. Another preferred coil is shown in U.S. Pat. No. 5,444,220 entitled "Asymmetric Induction Work Coil for Thermoplastic Welding", the disclosure of which is incorporated herein by reference. The coil assembly 60 includes a housing 61 having a hollow core 59 by which the housing 61 is slidably mounted on the vertical mount 58. The housing 61 is biased downwardly by a spring 62 so that the coil assembly 60 will ride up on the vertical mount when it encounters a change in contour or an uneven surface as the wheel 50 rolls along the surface of the top part 30, but the spring 62 always maintains the bottom face 64 of the coil assembly in contact with the inner surface of the circumferential casing 56. The bottom face 64 of the coil assembly 60 is a smooth, low friction sheet of material such as Teflon or polycarbonate that is sealed to the bottom of the housing 61 against leakage of cooling fluid from the housing 61.

A passage 66 through each strut 46 communicates through a lateral opening 68 in the axel 44 with an axial passage 70 in the axle 44. The axial passage 70 is sealed at both axial ends by suitable plugs 69. A lateral opening 72 centrally through the axel 44 communicates with a vertical passage 74 through the vertical mount 58. These passages conduct cooling fluid from a heat exchanger 76 and a pump 78 into the interior of the coil housing 61 where it passes into a compartment 80 containing a high power induction coil 82 (FIG. 3) to extract heat from the coil 82 (FIG. 3) generated by high power electric current delivered to the coil 82 through power lead lines 84 from a control system 86. The control system is the same system described in the aforesaid Mittleider application and does not form part of this invention.

Cooling fluid from the vertical passage 74 flows into the hollow core 59 of the coil assembly housing and pressurizes the core because of the resistance to flow of the cooling water around coil 82 in the compartment 80. The pressurized cooling fluid serves to slightly pressurize the hollow core 59 which acts as a cylinder on a piston, with the vertical mount 58 acting as the piston. This acts as an additional biasing means for biasing the coil assembly 60 downwardly against the inside surface of the circumferential casing 56. If desired, the spring may be replaced entirely with the fluid pressure biasing means provided by the vertical mount 58 in the hollow core 59.

The cooling fluid flows from the the hollow core 59 of the housing 61 into the the bottom of the compartment 80 and around the coil 82, extracting heat from the coil, and then flows upwardly through a distribution plate 88 in the compartment above the coil 82. The distribution plate ensures that the cooling water flows uniformly around the coil to avoid hot sopts in the coil. The fluid then flows out of the housing 61 through a passage 90 and into the wheel interior where it pressurizes the interior of the wheel 50. The fluid then flows from the wheel interior through a lateral opening 92 in the axle 44 on the opposite side of a plug 94 in the axial passage 70 placed to prevent the fluid from short circuiting the coil assembly by flowing straight through the axial passage 70. From the axial passage 70 on the right hand side of the plug 94, the cooling fluid flows through a lateral opening 96 in the axel which communicates with a passage 98 in the other strut 46'. The fluid flows through the passage 98 into fluid lines which are coupled between the strut and the heat exchanger. A variable restriction 100 may be placed in the fluid circuit at a suitable place, such as between the heat exchanger 76 and the pump 78, to help control the pressure in the wheel 50, and the variable restriction may be controlled by the control system 86 through a suitable control line 102.

Figure 4:
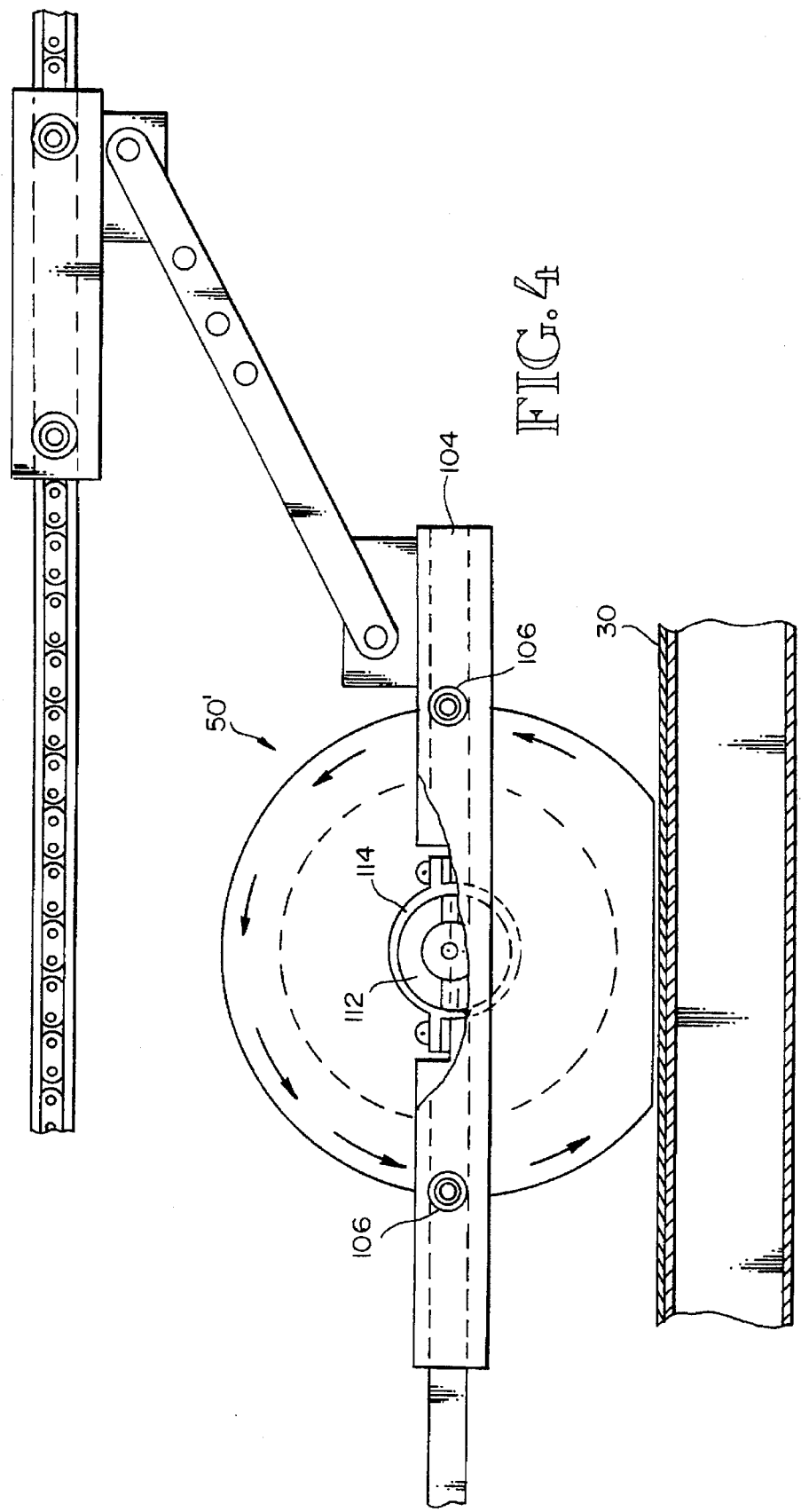
FIG. 4 is a side elevation of a second embodiment of conformal skate for welding two thermoplastic parts together in accordance with this invention.
Figure 5:
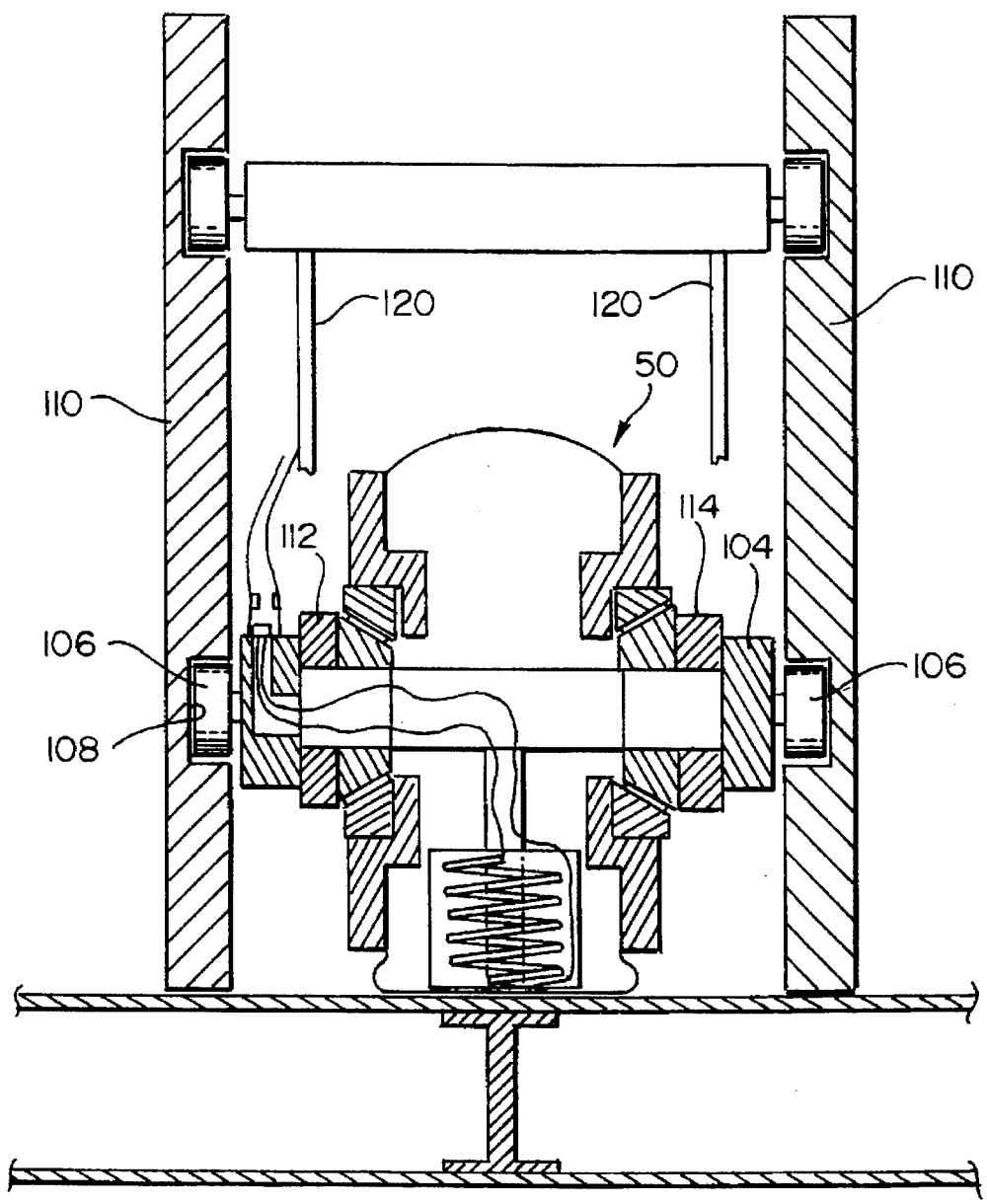
FIG. 5 is an end sectional elevation of the conformal skate shown in FIG. 4.

A second embodiment of the invention, shown in FIGS. 4 and 5, utilizes a slightly modified wheel 50' mounted on a skate frame 104, like the lower skate frame shown in the aforesaid Mittleider application. The skate frame 104 is supported for sliding movement over the wing skin 30 by two camroll bearings 106 projecting from both sides of the frame 104 into cam grooves 108 milled into the inside surfaces of a pair of parallel headers 110 mounted over the wing skin. The wheel 50' is supported and sealed on the same set of tapered bearings 48 and 52 as shown in FIG. 3 and is restrained against outward movement by a set of split clamp blocks 112 clamped on the axle and to the frame 104 by a clamp band 114. Power leads and fluid lines are routed out the ends of the axial passage 44 and through sealed ports on each side of upper surface of the frame 104 and into flexible conduits secured to the sealed ports 116. The flexible conduits are banded to two spaced bars of a link 120 which connects the lower frame 104 to an upper frame by which the lower frame is drawn over the wing skin 30 between the headers 110, as disclosed fully in the aforesaid Mittleider application. The fluid path in the wheel 50' is identical to the fluid path through the wheel.

Obviously, numerous modifications and variations of the described preferred embodiments are possible and will occur to those skilled in the art in view of this disclosure. Accordingly, it is expressly to be understood that these modifications and variations, and the equivalents thereof, may be practiced while remaining within the spirit and scope of my invention, as defined in the appended claims, wherein I claim:

1. A conformal skate for exerting pressure on a top part to be inductively welded to a bottom part using an induction coil for generating an alternating magnetic field which inductively heats a susceptor interposed in an interface between the top part and a bottom part made from thermoplastic material along an intended bond line defined by opposed faying surfaces of the top part and bottom part, comprising:

(a) a wheel having opposed side walls and a circumferential casing defining a wheel cavity, the casing being fluid impervious, flexible, inelastic material adapted for receiving a fluid under pressure;

(b) an axle having an axis and having an interior passage communicating through said axle at an intermediate position along the length of said axle:

(c) sealed bearings mounting said wheel on said axle for rotation thereon;

(d) an induction coil mounted on said axle in the wheel cavity on a vertical mount and oriented to project a magnetic field vertically into said parts;

(e) power leads from a power supply routed through said axle passage and connected to said coil; and (f) a fluid coupling for connecting a source of fluid under pressure to said axle passage for introducing fluid to the wheel cavity for pressurizing said wheel;

whereby, when the said wheel is rolled over the top part, said coil is energized to inductively heat said susceptor and soften the thermoplastic material in the faying surfaces of said parts to flatten a bottom portion of said circumferential casing conformably against said top part to exert uniform pressure on said bond line over a wide footprint of said wheel and to press said softened thermoplastic faying surfaces together to facilitate fusion bonding.

2. A conformal skate as defined in claim 1, wherein:

said vertical mount includes a spring loaded plunger on which said coil is mounted for pressing said coil against said circumferential casing from inside said wheel as said wheel rolls over uneven surfaces on said top part.

3. A conformal skate as defined in claim 1, wherein:

the sealed bearings include a bushing, having a taper defined by an inwardly tapering bushing bearing surface fixed to the axle and on each side of the wheel; and a receptacle, having an outwardly flaring receptacle bearing surface, the receptacle bearing surface having a taper equal to the taper of said inwardly tapering bushing bearing surface, fixed to each side wall of said wheel and rotating therewith, said bushing nested within said receptacle on said wheel;

whereby said pressure within said wheel pushes said side wall outward, pressing said receptacle bearing surface into nesting, sealing engagement with said tapering bushing bearing surface, thereby providing a sealed bearing surface between said wheel and said axle.

4. A conformal skate as defined in claim 3 wherein:

at least one of said outwardly flaring receptacle bearing surface and said inwardly tapering bushing bearing surface is coated with a soft, low friction material to facilitate both sealing and bearing functions.

5. A conformal skate as defined in claim 1, further comprising:

an interior passage in said mounting member, communicating through said axle with said passage in said axle, for admission of pressurizing fluid and power leads into said cavity of said wheel through said mounting member interior passage and axle passage.

6. A conformal skate as defined in claim 1, further comprising:

an opening into said axle communicating with an interior passage in said vertical mount for routing said power leads to said coil.

7. A conformal skate as defined in claim 6, further comprising:

a coil housing mounted on said vertical mount and having an interior compartment holding said coil with a vertical axis of the coil oriented vertically.

8. A conformal skate as defined in claim 7, further comprising:

interior channels in said housing communicating between said interior passage in said vertical mount and said interior compartment in said housing for conducting cooling fluid for cooling said coil.

9. A conformal skate as defined in claim 8, wherein:

said cooling fluid and fluid pressurizing said wheel are one and the same fluid.

10. A conformal skate as defined in claim 9, further comprising:

a heat exchanger and a pump connected by fluid lines and communicating with said interior passages in said vertical mount, whereby said cooling fluid is circulated by said pump through said coil and said wheel to extract heat from said coil and then through said heat exchanger to recool said fluid.

11. A conformal skate as defined in claim 7, further comprising a slideable connection between said coil housing and said vertical mount permitting vertical movement of said housing on said mount; and means for biasing said housing into contact with said circumferential casing.

12. A conformal skate as defined in claim 1, wherein: said mounting member includes two arms of a yoke.

13. A conformal skate as defined in claim 1, wherein: said mounting member includes a frame of a skate guided by tooling over said parts.

14. A conformal skate as defined in claim 13, wherein:

said mounting member further includes brackets on said frame for securing the axle to said frame, the mounting member including passages communicating through the axle with the axle passage for admission of pressuring fluid and power leads into the wheel; said passages in said mounting member including fluid couplings on said brackets for attachment of fluid supply lines for supply of cooling and pressurizing fluid through said couplings and into said axle passage.

15. A method of inductively welding a top thermoplastic part to an underlying thermoplastic part, comprising the steps of:

(a) positioning a susceptor along a bond line defined by opposed faying surfaces of the top part and the underlying part;

(b) rolling a conformal skate having a fluid-filled wheel housing an internal induction coil over the thermoplastic parts to create a pressure at the bond line while energizing the induction coil to heat the susceptor inductively, the susceptor softening the thermoplastic parts at the bond line to promote molecular diffusion to form a thermoplastic weld between the parts; and (c) biasing the induction coil against a circumferential casing of the wheel as the wheel rolls along one of the parts and encounters either a change in contour or an uneven surface.

16. The welding method of claim 15 wherein biasing includes applying pressure to the coil with a spring fixed between the coil and a fixed axle of the wheel.

17. The welding method of claim 15 further comprising the step of actively cooling the coil with flowing cooling fluid when the coil is energized.

18. The welding method of claim 17 wherein the cooling fluid flows through an axle of the wheel into a housing for the coil through a vertical mount connecting the coil housing to the axle, wherein the cooling fluid pressure on the housing provides biasing force.

19. A thermoplastic welding system for applying uniform pressure to a bond line while heating a susceptor between faying surfaces of at least two thermoplastic resin composites inductively using a moving induction coil, the system comprising:

(a) a liquid-filled wheel for moving over the composites to produce the bond line pressure, the wheel having a fixed axle and a flexible casing for conforming to the composite surface;

(b) an induction coil mounted within the wheel and biased against the casing;

(c) power cables for the coil passing through passages in the axle; and (d) a pump for pumping the liquid in the wheel to cool the coil when the coil is energized.

20. The welding system of claim 19 further comprising a biasing spring for holding the coil adjacent the casing, the spring acting between a housing for the coil and the axle.

* * * * *